US011062705B2

(12) United States Patent
Watanabe et al.

(10) Patent No.: US 11,062,705 B2
(45) Date of Patent: Jul. 13, 2021

(54) INFORMATION PROCESSING APPARATUS, INFORMATION PROCESSING METHOD, AND COMPUTER PROGRAM PRODUCT

(71) Applicant: KABUSHIKI KAISHA TOSHIBA, Tokyo (JP)

(72) Inventors: Nayuko Watanabe, Kawasaki Kanagawa (JP); Takehiko Kagoshima, Yokohama Kanagawa (JP); Hiroshi Fujimura, Yokohama Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 53 days.

(21) Appl. No.: 16/287,845

(22) Filed: Feb. 27, 2019

(65) Prior Publication Data

US 2020/0027453 A1 Jan. 23, 2020

(30) Foreign Application Priority Data

Jul. 18, 2018 (JP) .............................. JP2018-134664

(51) Int. Cl.
*G10L 15/22* (2006.01)
*G10L 15/08* (2006.01)

(52) U.S. Cl.
CPC .............. *G10L 15/22* (2013.01); *G10L 15/08* (2013.01); *G10L 2015/088* (2013.01); *G10L 2015/223* (2013.01)

(58) Field of Classification Search
CPC .................................. G10L 15/08; G10L 15/22
USPC ......................................................... 704/251
See application file for complete search history.

(56) References Cited

U.S. PATENT DOCUMENTS 7,228,276 B2 * 6/2007 Omote .................. G10L 15/063
704/243
8,000,972 B2 * 8/2011 Candelore .......... H04N 21/4828
704/275
10,311,873 B2 * 6/2019 Kume ..................... G10L 15/22

FOREIGN PATENT DOCUMENTS

| JP | 2007-025036 A | 2/2007 |
| JP | 2015-194766 | 11/2015 |
| JP | 2016-531375 | 10/2016 |
| WO | WO 2015/041892 | 3/2015 |

* cited by examiner

*Primary Examiner* — Susan I McFadden
(74) *Attorney, Agent, or Firm* — Knobbe, Martens, Olson & Bear, LLP

(57) ABSTRACT

According to one embodiment, an information processing apparatus includes one or more processors configured to detect a trigger from a voice signal, the trigger indicating start of voice recognition; and to perform voice recognition of a recognition sound section subsequent to a trigger sound section including the detected trigger, referring to a trigger and voice recognition dictionary corresponding to the trigger.

8 Claims, 9 Drawing Sheets

INFORMATION PROCESSING APPARATUS, INFORMATION PROCESSING METHOD, AND COMPUTER PROGRAM PRODUCT

CROSS-REFERENCE TO RELATED APPLICATIONS

This application is based upon and claims the benefit of priority from Japanese Patent Application No. 2018-134664, filed on Jul. 18, 2018; the entire contents of which are incorporated herein by reference.

FIELD

Embodiments described herein relate generally to an information processing apparatus, an information processing method, and a computer program product.

BACKGROUND speech recognition systems have been put to practical use, which recognize user's spoken commands to operate devices. Such a system detects speech of a certain keyword as a trigger for starting speech recognition and performs speech recognition to voice after the trigger.

In the case of continuous speech, however, it may be unable to detect a trigger and perform speech recognition after the trigger.

It is preferable to provide an information processing apparatus, an information processing method, and an information processing program that enable improvement in speech recognition.

DETAILED DESCRIPTION

According to one embodiment, generally, an information processing apparatus includes one or more processors configured to detect a trigger from a voice signal, the trigger indicating start of speech recognition; and to perform speech recognition of a recognition sound section subsequent to a trigger sound section including the detected trigger, referring to a trigger and speech recognition dictionary corresponding to the trigger.

Exemplary embodiment of an information processing apparatus, an information processing method, and a computer program product will be described in detail below with reference to the accompanying drawings.

Figure 1:
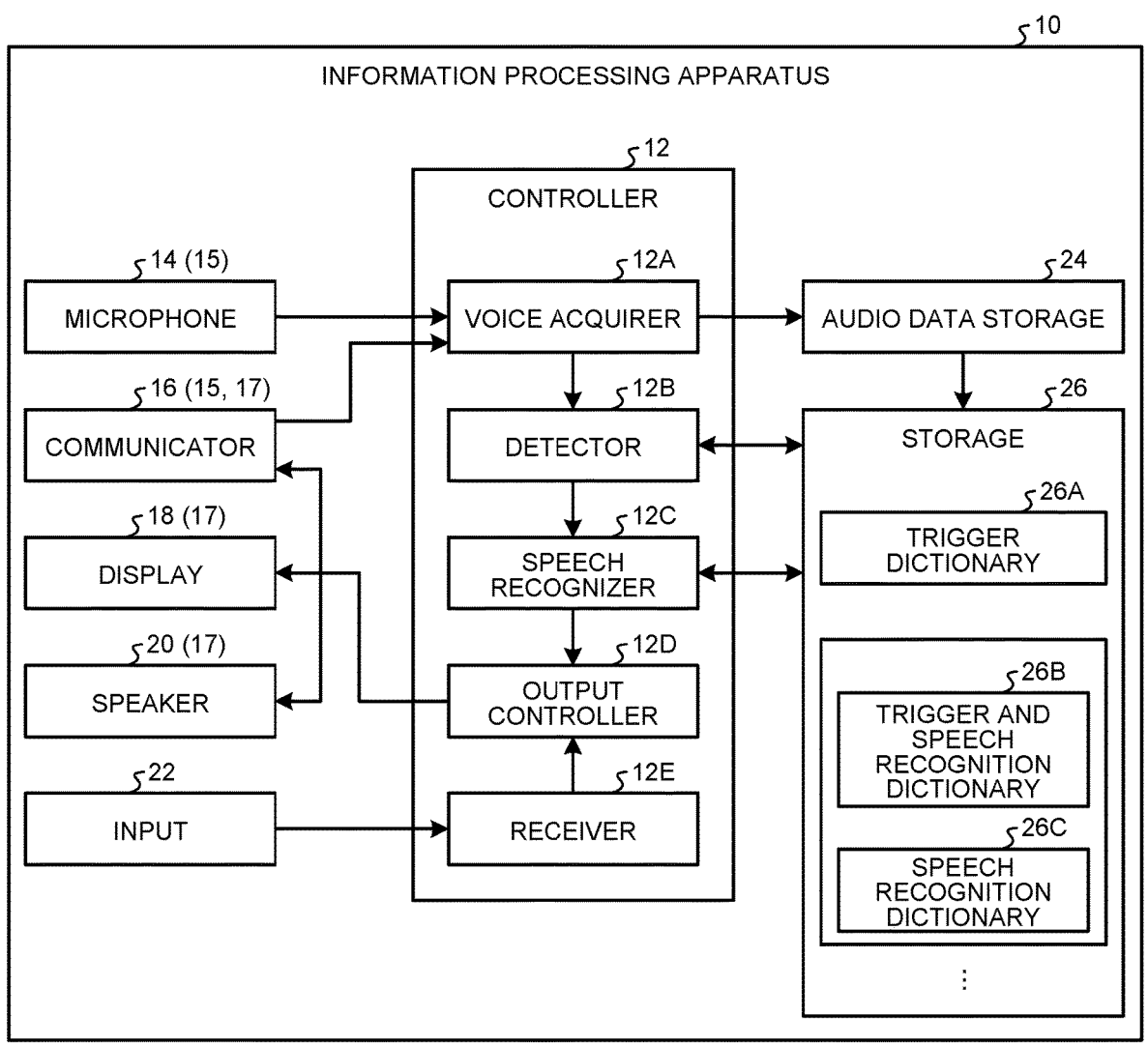
FIG. 1 is a functional block diagram of an information processing apparatus.

FIG. 1 is an exemplary functional block diagram of an information processing apparatus 10 according to the present embodiment. The information processing apparatus 10 recognizes voice from voice signals.

The information processing apparatus 10 includes a controller 12, a receiver 15, an output 17, an input 22, a audio data storage 24, and a storage 26. The controller 12, the receiver 15, the output 17, the input 22, the audio data storage 24, and the storage 26 are connected to one another to be able to transmit and receive data and signals.

The receiver 15 receives a voice signal. A voice signal refers to a signal representing voice. The voice signal is represented by a time-series set of sound signals. A sound signal refers to a signal representing sound collected at certain timing. Specifically, a voice signal is represented by a time-series set of sound signals collected at each timing.

The present embodiment illustrates the voice signal representing voice uttered by the user, as an example. The voice signal may include sound generated from an object, such as a machine. As another example, the voice signal may include both voice uttered by the user and sound generated from an object.

The receiver 15 includes at least one of a microphone 14 and a communicator 16. The microphone 14 collects voice, converts the voice into an electrical signal, and outputs the signal as a voice signal to the controller 12. The communicator 16 communicates with external devices through a network in a wired or wireless manner. When the communicator 16 functions as the receiver 15, the communicator 16 receives a voice signal of voice stored in or collected by an external device, from the external device.

The output 17 outputs various kinds of information. In the present embodiment, the output 17 outputs a result of speech recognition by the controller 12, as described in detail later.

The output 17 includes at least one of the communicator 16, a display 18, and a speaker 20. When the communicator 16 functions as the output 17, the communicator 16 transmits a result of speech recognition to the external device through a network, for example. The display 18 displays information representing a result of speech recognition. The display 18 represents a known liquid crystal display or organic electroluminescence (EL) display. The display 18 may be a touch panel integrally including both an input function and a display function.

The input 22 receives operation inputs from the user. The input 22 represents a keyboard, a mouse, and/or a pointing device.

At least one of the microphone 14, the display 18, the speaker 20, and the input 22 may be separately provided from the information processing apparatus 10. For example, at least one of the microphone 14, the display 18, the speaker 20, and the input 22 may be communicably connected to the information processing apparatus 10 in wired or wireless manner through the network. As another example, the microphone 14 or the display 18 may be incorporated in a terminal device connected with the information processing apparatus 10 through the network, for example.

The audio data storage 24 stores various types of data. The audio data storage 24 represents a known storage medium. In this embodiment, the audio data storage 24 functions as a buffer that stores therein voice signals received by the receiver 15. The capacity of the audio data storage 24 may be arbitrary as long as it can store a voice signal of a length exceeding the length of the trigger sound section of the trigger contained in the voice signal. Herein, trigger refers to a command and/or a signal triggering any operation. The trigger and the trigger sound section will be described in detail later.

The storage 26 stores various types of data. The storage 26 represents a known storage medium. In the present embodiment, the storage 26 stores a trigger dictionary 26A, a trigger and speech recognition dictionary 26B, and a speech recognition dictionary 26C in advance.

Figure 2A:
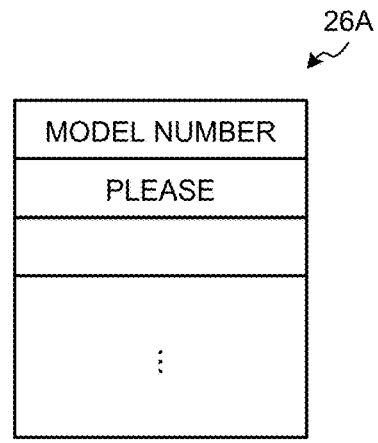
FIG. 2A is a schematic diagram illustrating an exemplary data configuration of a trigger dictionary.

FIG. 2A is a schematic diagram illustrating an exemplary data configuration of the trigger dictionary 26A. The trigger dictionary 26A represents a dictionary in which one or two or more triggers are registered in advance. The trigger refers to voice serving as a keyword that triggers speech recognition. The trigger may be a word (trigger word) representing a trigger, or a volume change pattern indicating a trigger. The present embodiment illustrates a trigger word as an example of the trigger. The trigger may indicate a command to an electronic device in addition to the start of speech recognition.

The storage 26 has a plurality of predetermined triggers registered in the trigger dictionary 26A. The triggers registered in the trigger dictionary 26A may be properly changeable in accordance with a user's operation to the input 22.

FIG. 2A illustrates "model number" and "please" as exemplary triggers. The triggers are not limited thereto.

The triggers may be spoken in stepwise manner. For example, the user may speak a trigger word representing an approximate instruction, and then speak trigger words representing a detailed instruction in stepwise manner. For this reason, the storage 26 may store a plurality of trigger dictionaries 26A hierarchically in the order of utterance of the triggers.

Figure 2B:
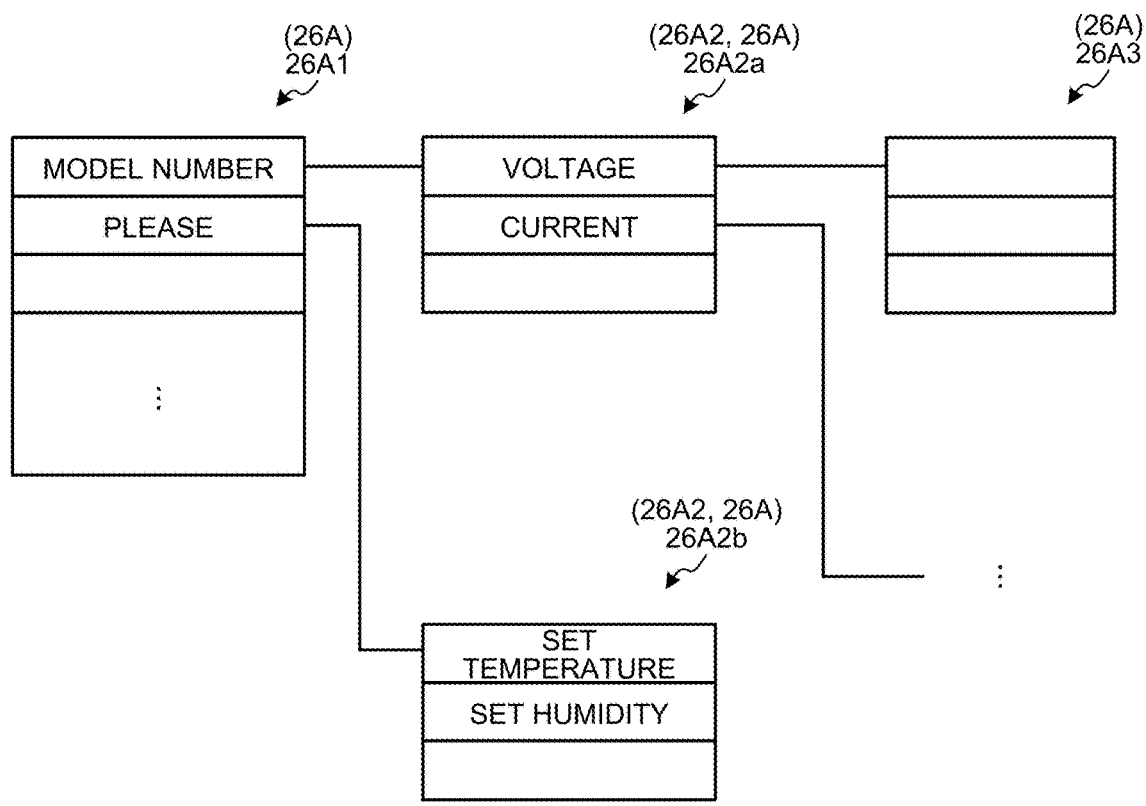
FIG. 2B is a schematic diagram illustrating an exemplary data configuration of a plurality of trigger dictionaries.

FIG. 2B is a schematic diagram illustrating an exemplary data configuration of trigger dictionaries 26A. The storage 26 registers triggers representing approximate instructions to an electronic device in a trigger dictionary 26A1, for example. The storage 26 stores therein trigger dictionaries 26A2 (26A2a and 26A2b) in which triggers to be spoken next representing instructions more detailed by one level are registered, in association with the triggers registered in the trigger dictionary 26A1. In addition, the storage 26 stores therein trigger dictionaries 26A3 in which triggers to be spoken next representing instructions more detailed by one more level are registered, in association with the triggers registered in the trigger dictionaries 26A2.

Thus, the storage 26 may store the trigger dictionaries 26A in a hierarchical manner.

Returning to FIG. 1, the trigger and speech recognition dictionary 26B and the speech recognition dictionary 26C are described next.

The storage 26 stores therein in advance the trigger and speech recognition dictionary 26B and the speech recognition dictionary 26C for each of the triggers. In the present embodiment, the storage 26 stores therein in advance the trigger and speech recognition dictionary 26B and the speech recognition dictionary 26C for each of the triggers registered in the trigger dictionary 26A.

For example, the storage 26 stores the trigger and voice speech recognition dictionaries 26B and the voice speech recognition dictionaries 26C in advance, in association with triggers ID for identifying the triggers registered in the trigger dictionary 26A.

The trigger and voice speech recognition dictionary 26B is a dictionary for deriving a result of voice speech recognition of a recognition sound section from a trigger sound section and a recognition sound section.

Specifically, the trigger and voice speech recognition dictionary 26B represents grammar data that defines the grammar to be used for voice speech recognition. The trigger and voice speech recognition dictionary 26B is a dictionary to which the trigger sound section and the recognition sound section are input as input data. That is, the trigger sound section and the recognition sound section are input to the trigger and voice speech recognition dictionary 26B as input data, which allows voice speech recognition of the trigger sound section and the recognition sound section contained in the input data, to acquire a result of voice speech recognition of the recognition sound section.

The voice speech recognition dictionary 26C is a dictionary for deriving a result of voice speech recognition of a sound section from the sound section. The term "sound section" refers to a section containing voice in a voice signal. The expression "containing voice" signifies containing sound of volume equal to or larger than a preset threshold. The threshold may be any volume value to distinguish between no sound and sound, and may be preset. That is, the sound section is represented by a time-series set of sound signals indicating sound.

The voice speech recognition dictionary 26C represents grammar data that defines the grammar to be used for voice speech recognition. The voice speech recognition dictionary 26C refers to a dictionary to which the sound sections are input as input data. That is, a sound section is input to the voice speech recognition dictionary 26C as input data, which allows voice speech recognition of the sound section referring to the voice speech recognition dictionary 26C, to acquire a result of the voice speech recognition of the sound section.

In the present embodiment, the trigger and voice speech recognition dictionary 26B and the voice speech recognition dictionary 26C are prepared for each of the triggers registered in the trigger dictionary 26A, and stored in advance in the storage 26 in association with the triggers ID of the triggers. Thus, the storage 26 stores the trigger and voice speech recognition dictionary 26B and the voice speech recognition dictionary 26C therein in advance for each of the triggers registered in the trigger dictionary 26A.

The voice audio data storage 24 and the storage 26 may be integrated as one storage. As another example, at least part of data stored in the storage 26 may be stored in an external device, such as an external server.

The controller 12 will be described next. The controller 12 controls the information processing apparatus 10. The controller 12 includes a voice acquirer 12A, a detector 12B, a voice speech recognizer 12C, an output controller 12D, and a receiver 12E.

The voice acquirer 12A, the detector 12B, the voice speech recognizer 12C, the output controller 12D, and the receiver 12E can be implemented by, for example, one or two or more processors. For example, each of the elements described above may be implemented by software, i.e., by causing a processor such as a central processing unit (CPU) to execute a program. The elements may be implemented by hardware, e.g., a processor such as a dedicated integrated circuit (IC). The elements may be implemented by both software and hardware. In the case of using a plurality of processors, each of the processors may implement one or two or more of the elements.

The voice acquirer 12A acquires a voice signal. In the present embodiment, the voice acquirer 12A acquires a voice signal from the microphone 14 or the communicator 16. The voice acquirer 12A stores the acquired voice signal in the voice audio data storage 24.

As described above, the voice audio data storage 24 has the capacity to store a voice signal of a length exceeding the length of a trigger sound section, and a voice signal is a time-series set of sound signals. For this reason, when the voice audio data storage 24 becomes full in capacity, the voice acquirer 12A deletes the sound signals from the voice signal in the voice audio data storage 24 in order from the most previous sound signal, and overwrites the signal with a new sound signal for storage. Thus, the voice audio data storage 24 stores the latest voice signal.

The detector 12B detects a trigger for starting voice speech recognition from the voice signal. The detector 12B reads the voice signal from the voice audio data storage 24 in time series, and detect the trigger by identifying a time-series set of sound signals matching any of the triggers registered in the trigger dictionary 26A. The detector 12B may detect triggers by any known method. For example, the detector 12B may detect a trigger by reading the voice signal from the head in time-series, comparing the voice signal with a signal being a time-series set of sound signals converted from each of the triggers stored in the trigger dictionary 26A and determining whether there is any section matching the converted signal.

As described above, the voice audio data storage 24 may store multiple trigger dictionaries 26A in a hierarchical manner. In this case, the detector 12B preferably reads the voice signal in time series, and, upon each detection of a trigger, uses the trigger dictionary 26A (for example, the trigger dictionary 26A2) of a lower level corresponding to the detected trigger for detection of the next trigger. Thus, the detector 12B reads the hierarchically stored trigger dictionaries 26A in order from the upper level to the lower level for the next trigger detection, thereby reducing the number of trigger candidates to detect and improving the accuracy of trigger detection.

Upon detection of a trigger, the detector 12B notifies the voice speech recognizer 12C of the trigger ID of the detected trigger and head information representing the head of the trigger sound section of the trigger. The head of the trigger sound section refers to the most upstream end of the trigger sound section in time series. The head information of the trigger sound section may be any information as long as it represents the head of the trigger sound section. The head information is, for example, represented by start time indicating the head of the trigger sound section. In the following, the head and the head information may be referred to as start time.

The voice speech recognizer 12C recognizes voice from the recognition sound section subsequent to the trigger sound section of the detected trigger in the voice signal, referring to the trigger and voice speech recognition dictionary 26B corresponding to the trigger detected by the detector 12B. In other words, the voice speech recognizer 12C performs voice speech recognition of the trigger sound section of the detected trigger and the recognition sound section subsequent to the trigger sound section in accordance with the trigger and voice speech recognition dictionary 26B corresponding to the trigger in the trigger sound section, to acquire a result of the voice speech recognition of the recognition sound section. In the present embodiment, the detector 12B and the voice speech recognizer 12C execute the detection and the voice speech recognition in parallel.

More specifically, the voice speech recognizer 12C reads voice signals from the voice audio data storage 24 in chronological order, in parallel with reading and detection of the voice signals by the detector 12B. When receiving the trigger ID and the head information of the trigger sound section from the detector 12B, the voice speech recognizer 12C determines detection of a trigger. The voice speech recognizer 12C reads, from the storage 26, the trigger and voice speech recognition dictionary 26B corresponding to the trigger ID received from the detector 12B.

The voice speech recognizer 12C performs voice speech recognition of the recognition sound section subsequent to the trigger sound section in a unitary section, referring to the read trigger and voice speech recognition dictionary 26B. The unitary section ranges from the head of the trigger sound section of the detected trigger to a predetermined end after the trigger sound section in the voice signal.

The unitary section serves as unit of voice speech recognition by the voice speech recognizer 12C, referring to the trigger and voice speech recognition dictionary 26B. In other words, the unitary section refers to the unit of section of a voice signal 40 to be input to the voice speech recognition dictionary 26C when the voice speech recognizer 12C performs voice speech recognition referring to the trigger and voice speech recognition dictionary 26B. The end of the unitary section may be arbitrarily set after the trigger sound section of the detected trigger.

Figure 3:
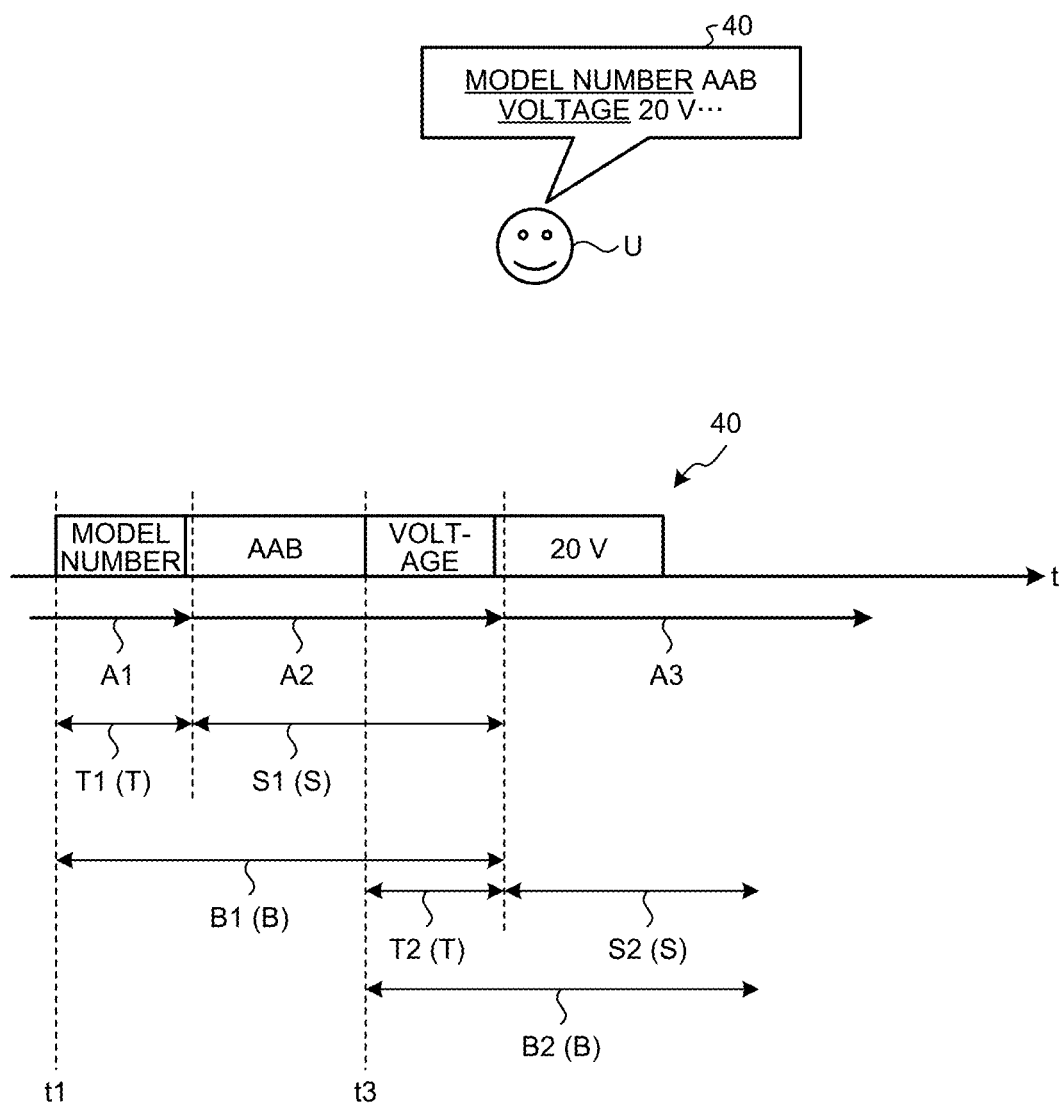
FIG. 3 is an explanatory drawing illustrating an exemplary trigger detection and speech recognition.

FIG. 3 is an explanatory drawing illustrating an exemplary trigger detection and voice speech recognition. Suppose that the voice acquirer 12A acquire the voice signal 40 representing "model number AA, voltage 20 V" from speech of a user U, by way of example. In addition, suppose that the words "model number" and "voltage" in the voice signal 40 be trigger words representing triggers, and that these triggers be registered in advance in the trigger dictionary 26A.

The detector 12B reads the voice signal 40 from the head in chronological order for trigger detection (see arrow A1). The detector 12B detects the trigger "model number" from a trigger sound section T1 including the trigger "model number" in the voice signal 40. The trigger sound section T1 is an exemplary trigger sound section T. The detector 12B notifies the voice speech recognizer 12C of the trigger ID of the detected trigger "model number" and the start time t1 of the trigger sound section T1.

Upon receiving the trigger ID of the detected trigger "model number" and the start time t1 of the trigger sound section T1 from the detector 12B, the voice speech recognizer 12C reads a unitary section B1 ranging from the start time t1 of the trigger sound section T1 to the end after the trigger sound section T1 from the voice signal 40. The unitary section B1 is an exemplary unitary section B. The voice speech recognizer 12C performs voice speech recognition of the unitary section B1 including the trigger sound section T1, referring to the trigger and voice speech recognition dictionary 26B corresponding to the trigger ID of the trigger "model number", to output a result of the voice speech recognition of a recognition sound section S1 of the unitary section B1. The recognition sound section S1 is an exemplary recognition sound section S subsequent to the trigger sound section T1 in the unitary section B1.

Meanwhile, the detector 12B reads and detects the voice signal 40 in parallel (see arrow A2). The detector 12B reads and detects the trigger "voltage" from a trigger sound section T2 containing the trigger "voltage". The detector 12B notifies the voice speech recognizer 12C of the trigger ID of the detected trigger "voltage" and the start time t3 of a trigger sound section T2. The trigger sound section T2 is an exemplary trigger sound section T. In addition, the detector 12B continues reading and detecting the voice signal 40 (see arrow A3).

Upon receiving the trigger ID of the detected trigger "voltage" and the start time t3 of the trigger sound section T2 from the detector 12B, the voice speech recognizer 12C reads a unitary section B2 ranging from the start time t3 of the trigger sound section T2 to the end after the trigger sound section T2 in the voice signal 40. The unitary section B2 is an exemplary unitary section B. The voice speech recognizer 12C performs voice speech recognition of the unitary section B2, referring to the trigger and voice speech recognition dictionary 26B corresponding to the trigger ID of the trigger "voltage", to output a result of the voice speech recognition of a recognition sound section S2 in the unitary section B2. The recognition sound section S2 is an exemplary recognition sound section S subsequent to the trigger sound section T2 in the unitary section B2.

Thus, the voice speech recognizer 12C uses not only the recognition sound section S of interest but also the unitary section B including both the trigger sound section T and the recognition sound section S as input data to the trigger and voice speech recognition dictionary 26B corresponding to the trigger, to output a result of the voice speech recognition of the recognition sound section S in accordance with the trigger and voice speech recognition dictionary 26B.

As described above, the unitary section B may be an arbitrary section as long as it ranges from the head of the trigger sound section T of the detected trigger to a predetermined end after the trigger sound section T in the voice signal 40.

For example, the unitary section B has a predetermined length starting from the head of the trigger sound section T of the detected trigger and exceeding the length of the trigger sound section T. As another example, the unitary section B ranges from the head of the trigger sound section T of the detected trigger to a head of another trigger sound section T following the trigger sound section T. As another example, the unitary section B ranges from the head of the trigger sound section T of the detected trigger to a silence section following the trigger sound section T.

Figure 4A:
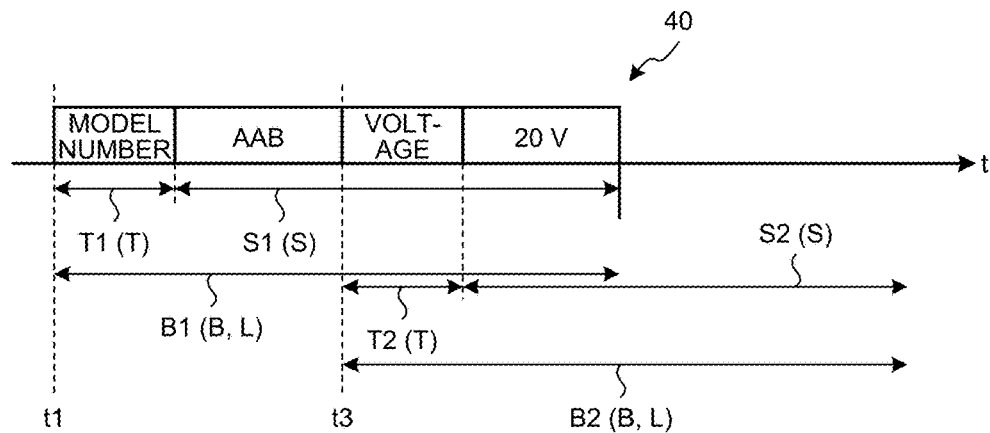
FIG. 4A is an explanatory drawing illustrating an exemplary a unitary section.
Figure 4B:
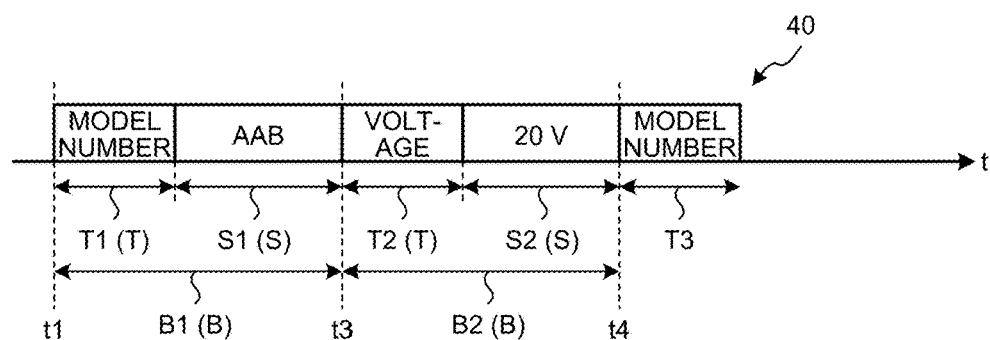
FIG. 4B is an explanatory drawing illustrating an exemplary unitary section.
Figure 4C:
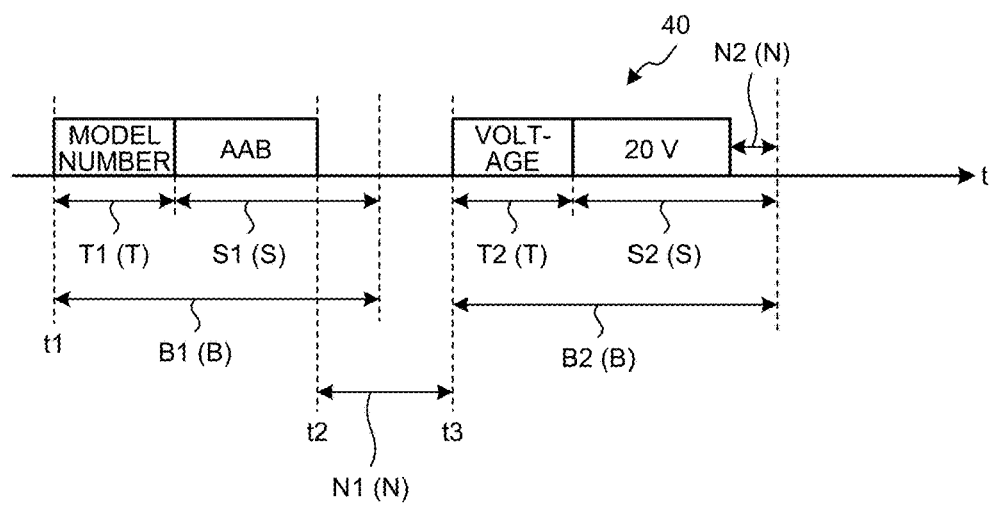
FIG. 4C is an explanatory drawing illustrating an exemplary unitary section.

FIG. 4A, FIG. 4B, and FIG. 4C illustrates examples of the unitary section B.

As illustrated in FIG. 4A, for example, the unitary section B has a predetermined length L starting from the head of the trigger sound section T of the detected trigger and exceeding the length of the trigger sound section T. In this case, the unitary section B1 is a section having a length L starting from the start time t1 of the trigger sound section T1 containing the trigger "model number". The unitary section B2 has a length L starting from the start time t2 of the trigger sound section T2. The length L may be preset to a length exceeding the length of the longest one of the trigger sound sections of the triggers registered in the trigger dictionary 26A.

In the unitary section B having a predetermined length L from the head of the trigger sound section T of the detected trigger, the recognition sound section S (for example, recognition sound section S1) may include the trigger sound section T (for example, the trigger sound section T2) of the trigger to be detected next. In the present embodiment, the unitary section B may be any section as long as it includes a trigger sound section T at the head in time series, or the recognition sound section S subsequent to the trigger sound section T may include another trigger sound section T.

In this case, the voice speech recognizer 12C can perform voice speech recognition of the unitary sections B having the same length L, each time the detector 12B detects a trigger.

As illustrated in FIG. 4B, the unitary section B may range from the head of the trigger sound section T of the detected trigger to the head of another trigger sound section T following the trigger sound section T. In this case, the unitary section B1 ranges from the start time t1 of the trigger sound section T1 to the start time t3 of the subsequent trigger sound section T2. The unitary section B2 ranges from the start time t3 of the trigger sound section T2 to the start time t4 of the subsequent trigger sound section T3.

In the unitary section B ranging from the head of the trigger sound section T of the detected trigger to the head of another trigger sound section T following the trigger sound section T, the recognition sound section S (recognition sound section S1 and recognition sound section S2) includes no other trigger sound sections T.

In this case, the voice speech recognizer 12C can perform voice speech recognition of the recognition sound section S following each trigger and including no other triggers. That is, the voice speech recognizer 12C can perform voice speech recognition of the recognition sound section S continuously following the trigger in unit of trigger.

The unitary section B may range from the head of the trigger sound section T of the detected trigger to the end of another trigger sound section T following the trigger sound section T. In this case, the recognition sound section S of the unitary section B includes another trigger sound section T.

As illustrated in FIG. 4C, the unitary section B may range from the head of the trigger sound section T of the detected trigger to a silence section N following the trigger sound section T. In this case, as illustrated in FIG. 4C, the unitary section B1 ranges from the start time t1 of the trigger sound section T1 to a silence section N1 following the trigger sound section T1. The silence section N1 is an exemplary silence section N. The end of the unitary section B1 may be set to any time from the start time t2 to the end time t3 of the silence section N1. The unitary section B2 may be any section ranging from the start time t3 of the trigger sound section T2 to a silence section N2 following the trigger sound section T2. The silence section N2 is an exemplary silence section N. The end of the unitary section B2 may be set to any time from the start time to the end time of the silence section N2, as with the unitary section B1.

In this case, the voice speech recognizer 12C can divide the voice signal 40 by each silence section N for voice speech recognition.

The voice speech recognizer 12C may determine the silence section N in the voice signal 40 by a known method. The detector 12B may also detect the silence section N from the voice signal 40. In this case, the voice speech recognizer 12C may determine the silence section N, upon receipt of information on the silence section N from the detector 12B. As another example, the information processing apparatus 10 may include a known detector that identifies the silence section N from the voice signal 40. In this case, the voice speech recognizer 12C may acquire a result of identification of the silence section N from the detector to determine the silence section N.

Returning to FIG. 1, according to the present embodiment, the voice speech recognizer 12C performs voice speech recognition of the trigger sound section T of the detected trigger and the recognition sound section S subsequent to the trigger sound section T in the voice signal 40, in accordance with the trigger and voice speech recognition dictionary 26B corresponding to the detected trigger, to acquire a result of the speech recognition of the recognition sound section S.

Because of this, the information processing apparatus 10 according to the present embodiment can execute voice speech recognition of all the triggers in the voice signal 40 without omitting the recognition sound section S subsequent to the trigger sound section T of each trigger. That is, the information processing apparatus 10 according to the present embodiment can perform voice speech recognition of the recognition sound sections S continuously following all the triggers in the voice signal 40 of speech of continuous words containing multiple triggers.

As described above, suppose that the unitary section B, serving as the unit of voice speech recognition by the voice speech recognizer 12C referring to the trigger and voice speech recognition dictionary 26B, range from the head of the trigger sound section T of the detected trigger to the silence section N following the trigger sound section T. Also, suppose that the voice signal 40 include, after the unitary section B, a sound section including no trigger sound section T at the head. In this case, the sound section is not subjected to voice speech recognition, referring to the trigger and voice speech recognition dictionary 26B.

In view of this, the voice speech recognizer 12C performs voice speech recognition, switching between the voice speech recognition dictionary 26C and the trigger and voice speech recognition dictionary 26B.

Specifically, the voice speech recognizer 12C performs voice speech recognition of the recognition sound section S in the unitary section B ranging from the head of the trigger sound section T of the detected trigger to the silence section N following the trigger sound section T in the voice signal 40, referring to the trigger and voice speech recognition dictionary 26B corresponding to the detected trigger. The voice speech recognizer 12C then performs voice speech recognition of the sound section subsequent to the silence section N in the voice signal 40, referring to the voice speech recognition dictionary 26C corresponding to the detected trigger.

Figure 5:
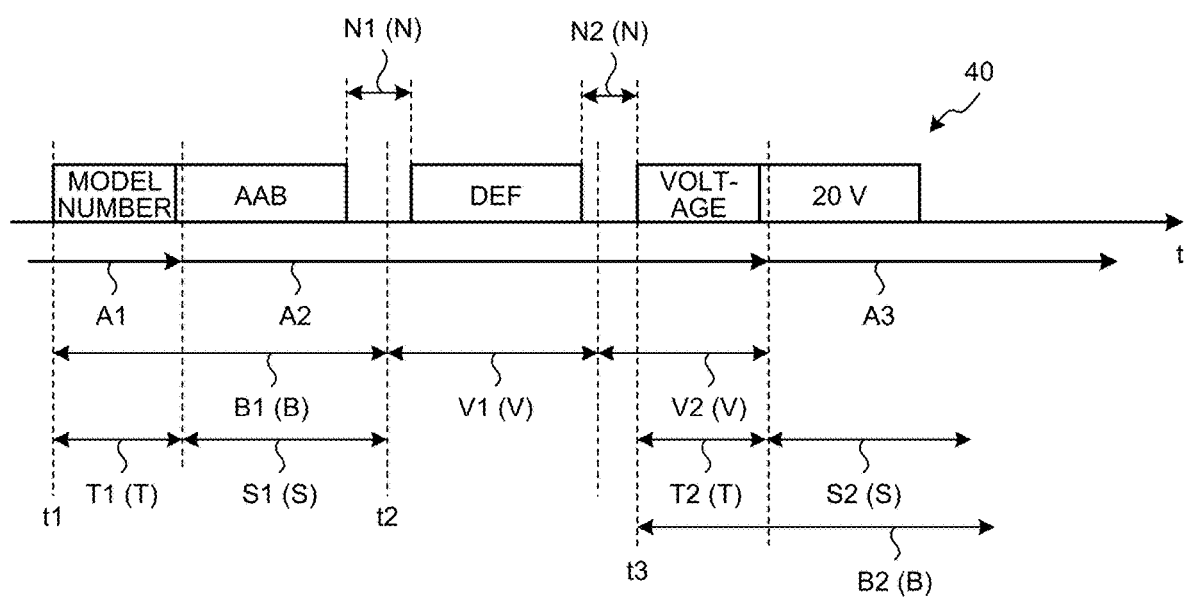
FIG. 5 is an explanatory drawing illustrating an exemplary speech recognition.

FIG. 5 illustrates an exemplary voice speech recognition, switching between the trigger and voice speech recognition dictionary 26B and the voice speech recognition dictionary 26C. As illustrated in FIG. 5, the detector 12B reads and detects a trigger from the voice signal 40 from the head in chronological order (see arrow A1). The detector 12B reads and detects the trigger "model number" from the trigger sound section T1 containing the trigger "model number" in the voice signal 40. The detector 12B notifies the voice speech recognizer 12C of the trigger ID of the detected trigger "model number" and the start time t1 of the trigger sound section T1.

Upon receiving the trigger ID of the detected trigger "model number" and the start time t1 of the trigger sound section T1 from the detector 12B, the voice speech recognizer 12C reads the unitary section B1 ranging from the start time t1 of the trigger sound section T1 to the silence section N1 following the trigger sound section T1 in the voice signal 40. The voice speech recognizer 12C performs voice speech recognition of the recognition sound section S1 in the unitary section B1, referring to the trigger and voice speech recognition dictionary 26B corresponding to the trigger ID.

The voice speech recognizer 12C performs voice speech recognition of a sound section V1 following the silence section N1 at the end of the unitary section B1, referring to the voice speech recognition dictionary 26C corresponding to the previously detected trigger "model number". The sound section V1 is an exemplary voice section V between the silence section N1 and a silence section N2.

The voice speech recognizer 12C performs voice speech recognition of each of the sound sections V (V1 and V2) subsequent to the unitary section B1, referring to the voice speech recognition dictionary 26C corresponding to the previously detected trigger "model number", until the detector 12B detects a next trigger (trigger "voltage" in the example of FIG. 5).

The voice speech recognizer 12C may determine the detection of the next trigger by the detector 12B, when receiving a new trigger ID and the start time of the trigger sound section T of the trigger identified by the trigger ID from the detector 12B.

Specifically, the detector 12B reads and detects the voice signal 40 in parallel (see arrow A2), and reads and detects the trigger "voltage" from the trigger sound section T2 containing the next trigger "voltage". The detector 12B notifies the voice speech recognizer 12C of the trigger ID of the detected trigger "voltage" and the start time t3 of the trigger sound section T2. The detector 12B continues reading and detecting the voice signal 40 (see arrow A3).

Upon receipt of the trigger ID of the new trigger "voltage" and the start time t3 of the trigger sound section T2, the voice speech recognizer 12C ends voice speech recognition of the sound section V based on the voice speech recognition dictionary 26C corresponding to the trigger "model number". The voice speech recognizer 12C reads the unitary section B2 ranging from the start time t3 of the trigger sound section T2 to the silence section N following the trigger sound section T2 in the voice signal 40. The voice speech recognizer 12C may perform voice speech recognition of the recognition sound section S2 in the unitary section B2, referring to the trigger and voice speech recognition dictionary 26B corresponding to the trigger ID of the trigger "voltage", in the same manner as above.

Thus, for the unitary section B ranging from the head of the trigger sound section T to the silence section N following the trigger sound section T, the voice speech recognizer 12C performs voice speech recognition, switching between the trigger and voice speech recognition dictionary 26B and the voice speech recognition dictionary 26C to be referred to. Thereby, the voice speech recognizer 12C can perform voice speech recognition, without omission, of the recognition sound sections S continuously following all the triggers in the voice signal 40 and the sound sections V non-continuously following the triggers.

Returning to FIG. 1, the output controller 12D outputs the result of voice speech recognition of the voice speech recognizer 12C to the output 17. For example, the output controller 12D transmits the result of voice speech recognition to an external device through the communicator 16. As another example, the output controller 12D displays the result of voice speech recognition on the display 18. As another example, the output controller 12D outputs the result of voice speech recognition by sound from the speaker 20.

As described above, the voice speech recognizer 12C derives a result of voice speech recognition of the recognition sound section S succeeding the trigger sound section T of each of the triggers contained in the voice signal 40. That is, the voice speech recognizer 12C derives multiple results of voice speech recognition.

As explained with reference to FIG. 4A, the voice speech recognizer 12C may use a section of a predetermined length L starting from the head of the trigger sound section T of the detected trigger and exceeding the length of the trigger sound section T, as the unitary section B. In this case, the recognition sound section S in one unitary section B may include a trigger sound section T to be detected next and/or a recognition sound section S succeeding the trigger sound section T. Thus, the result of voice speech recognition derived for each of the triggers may include that of an overlapping section in the voice signal 40.

In view of this, the output controller 12D may remove a result of voice speech recognition of a section after the section concerned in the voice signal 40 from each of the results of voice speech recognition for output.

Specifically, as illustrated in FIG. 4A, the output controller 12D may remove the results of voice speech recognition of the subsequent trigger sound section T2 and the recognition sound section S2 from the result of voice speech recognition of the recognition sound section S1 to set the resultant as a result of voice speech recognition of the recognition sound section S1 succeeding the trigger "model number".

Returning to FIG. 1, the output controller 12D may select one of the results of voice speech recognition, and output the selected result to the output 17.

In this case, the receiver 12E receives input of the selected result of voice speech recognition to output from the input 22. For example, the output controller 12D displays a list of the results of the voice speech recognition by the voice speech recognizer 12C on the display 18. The user operates the input 22 to select a result of voice speech recognition to output from the results of voice speech recognitions displayed on the display 18. It is preferable that a user different from the speaker of the voice signal 40 select the result of voice speech recognition to output. Specifically, the user who selects the result of voice speech recognition to output is preferably an administrator of the information processing apparatus 10.

When the receiver 12E receives the input of the selected result of voice speech recognition to output from the input 22, the output controller 12D outputs, to the output 17, the result of voice speech recognition received by the receiver 12E among the results of voice speech recognition recognized by the voice speech recognizer 12C.

When speaking, the user may speak an erroneous trigger word, for example, and then restate a correct trigger word. In such a case, the administrator issues an operation command through the input 22 to select a result of voice speech recognition to output, which enables the output controller 12D to selectively output a proper result of voice speech recognition.

Next, an exemplary voice speech recognition by the information processing apparatus 10 according to the present embodiment is described.

Figure 6:
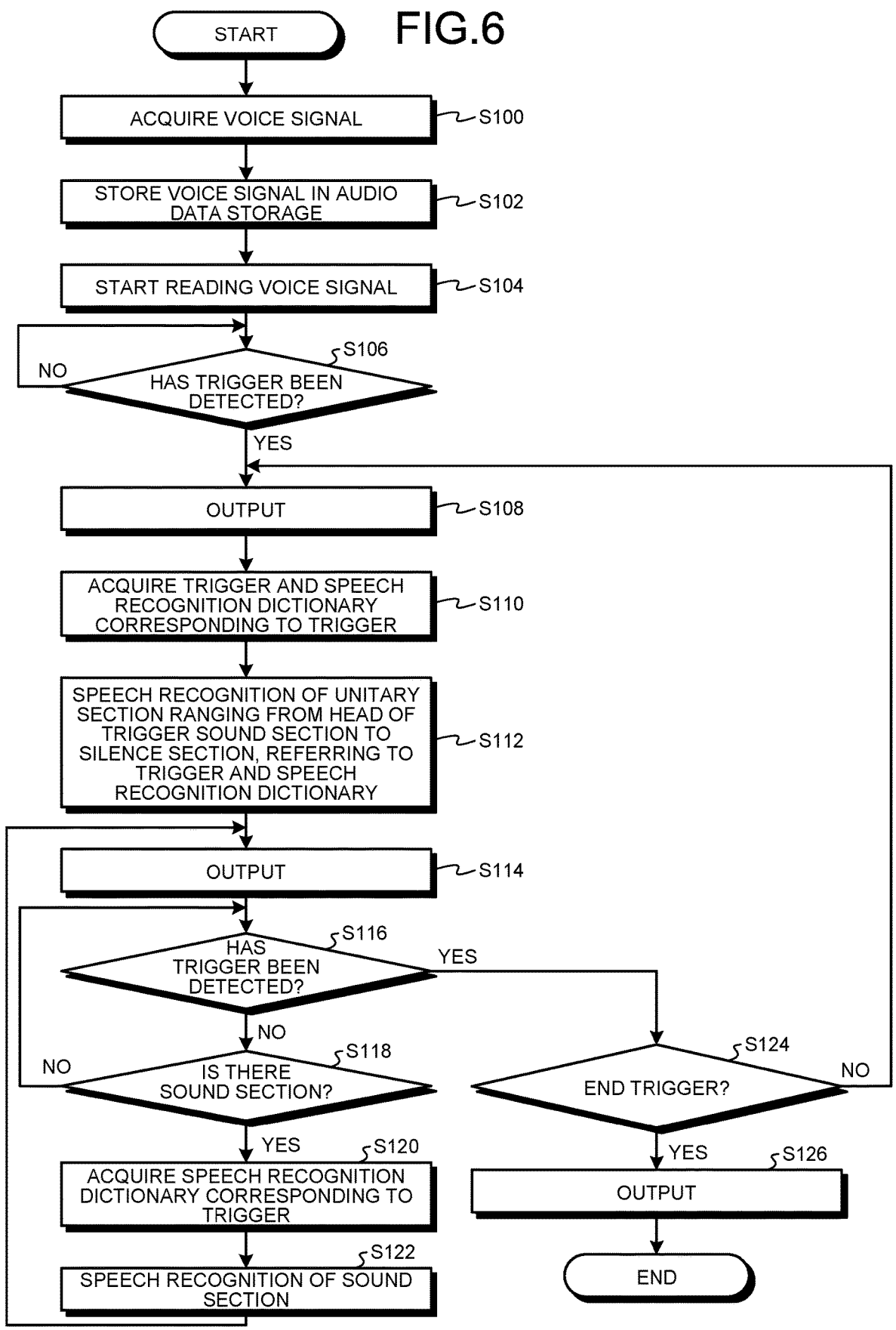
FIG. 6 is a flowchart illustrating an exemplary speech recognition procedure.

FIG. 6 is a flowchart illustrating an exemplary voice speech recognition procedure by the information processing apparatus 10. FIG. 6 illustrates an example that the voice acquirer 12A sets a section ranging from the head of the trigger sound section T of the detected trigger to the silence section N following the trigger sound section T, as the unitary section B.

The voice acquirer 12A acquires a voice signal 40 from the receiver 15 (Step S100), and stores the voice signal 40 in the voice audio data storage 24 (Step S102). Each time the receiver 15 receives a voice signal 40, the voice acquirer 12A continuously stores (overwrites) the voice audio data signal 40 in the voice audio data storage 24.

Then, the detector 12B starts reading the voice signal 40 from the voice audio data storage 24 in time series (Step S104). The detector 12B repeats negative determination (No at Step S106) until detecting any of triggers registered in the trigger dictionary 26A. Upon detecting a trigger (Yes at Step S106), the detector 12B notifies the voice speech recognizer 12C of the trigger ID of the detected trigger and the start time of the trigger sound section T.

Upon every detection of a new trigger by the detector 12B, the speech recognizer 12C repeats the processing from Step S110 to Step S112.

Specifically, the voice speech recognizer 12C acquires the trigger and voice speech recognition dictionary 26B corresponding to the detected trigger from the storage 26 (Step S110). The voice speech recognizer 12C reads and acquires the trigger and voice speech recognition dictionary 26B, corresponding to the trigger ID previously received from the detector 12B, from the storage 26.

The voice speech recognizer 12C performs voice speech recognition of the recognition sound section S in the unitary section B ranging from the start time of the previously received trigger sound section T from the detector 12B to the silence section N following the trigger sound section T in the voice signal 40, referring to the trigger and voice speech recognition dictionary 26B acquired at Step S110 (Step S112).

The output controller 12D outputs the result of voice speech recognition of Step S112 or Step S122 to the output 17 (Step S114).

The voice speech recognizer 12C determines whether a new trigger has been detected (Step S116). The voice speech recognizer 12C makes the determination at Step S116 by determining whether to have received a new trigger ID and the start time of the trigger sound section T from the detector 12B.

When no new trigger is detected (No at Step S116), the voice speech recognizer 12C proceeds to Step S118. At Step S118, the voice speech recognizer 12C determines whether in the voice signal 40, there is any sound section V subsequent to the unitary section B or the sound section V subjected to the previous voice speech recognition (Step S118).

With a negative determinations made at Step S118 (No at Step S118), the voice speech recognizer 12C returns to Step S116. When an affirmative determination at Step S118 (Yes at Step S118), the voice speech recognizer 12C proceeds to Step S120.

At Step S120, the voice speech recognizer 12C acquires the voice speech recognition dictionary 26C corresponding to the previously detected trigger from the storage 26 (Step S120).

The voice speech recognizer 12C performs voice speech recognition of the sound section V identified at Step S118, referring to the voice speech recognition dictionary 26C acquired at Step S120 (Step S122). The voice speech recognizer 12C then returns to Step S114.

With an affirmative determination made at Step S116 (Yes at Step S116), the detector 12B determines whether the trigger detected at Step S116 is an end trigger indicating the end of the voice speech recognition (Step S124). With a negative determination made at Step S124 (No at Step S124), the voice speech recognizer 12C returns to Step S108. With an affirmative determination made at Step S124 (Yes at Step S124), the voice speech recognizer 12C proceeds to Step S126.

At Step S126, the output controller 12D outputs the result of voice speech recognition to the output 17 (Step S126), completing the routine.

As described above, the information processing apparatus 10 according to the present embodiment includes the detector 12B and the voice speech recognizer 12C. The detector 12B detects a trigger indicating start of voice speech recognition from the voice signal 40. The voice speech recognizer 12C performs voice speech recognition of the recognition sound section S subsequent to the trigger sound section T including the trigger, referring to the trigger and voice speech recognition dictionary 26B corresponding to the detected trigger.

Thus, in the information processing apparatus 10 according to the present embodiment, the voice speech recognizer 12C acquires a result of voice speech recognition of the recognition sound section S subsequent to the trigger sound section T of the detected trigger in the voice signal 40 through the voice speech recognition of the trigger sound section T and the recognition sound section S, in accordance with the trigger and voice speech recognition dictionary 26B corresponding to the detected trigger. In addition, the trigger and voice speech recognition dictionary 26B is intended for deriving a result of voice speech recognition of the recognition sound section S not only from the trigger sound section T but from the trigger sound section T and the recognition sound section S.

Thus, the information processing apparatus 10 according to the present embodiment can perform voice speech recognition, without omission, of the recognition sound sections S subsequent to the trigger sound sections T of all the triggers included in the voice signal 40. That is, for continuous utterance of multiple words including multiple triggers, the information processing apparatus 10 according to the present embodiment can perform voice speech recognition of the recognition sound sections S continuously following all the triggers contained in the voice signal 40 of the utterance.

Conventionally, it is difficult to perform voice speech recognition of the voice signal 40 of the continuous utterance of multiple words including multiple triggers.

Figure 7A:
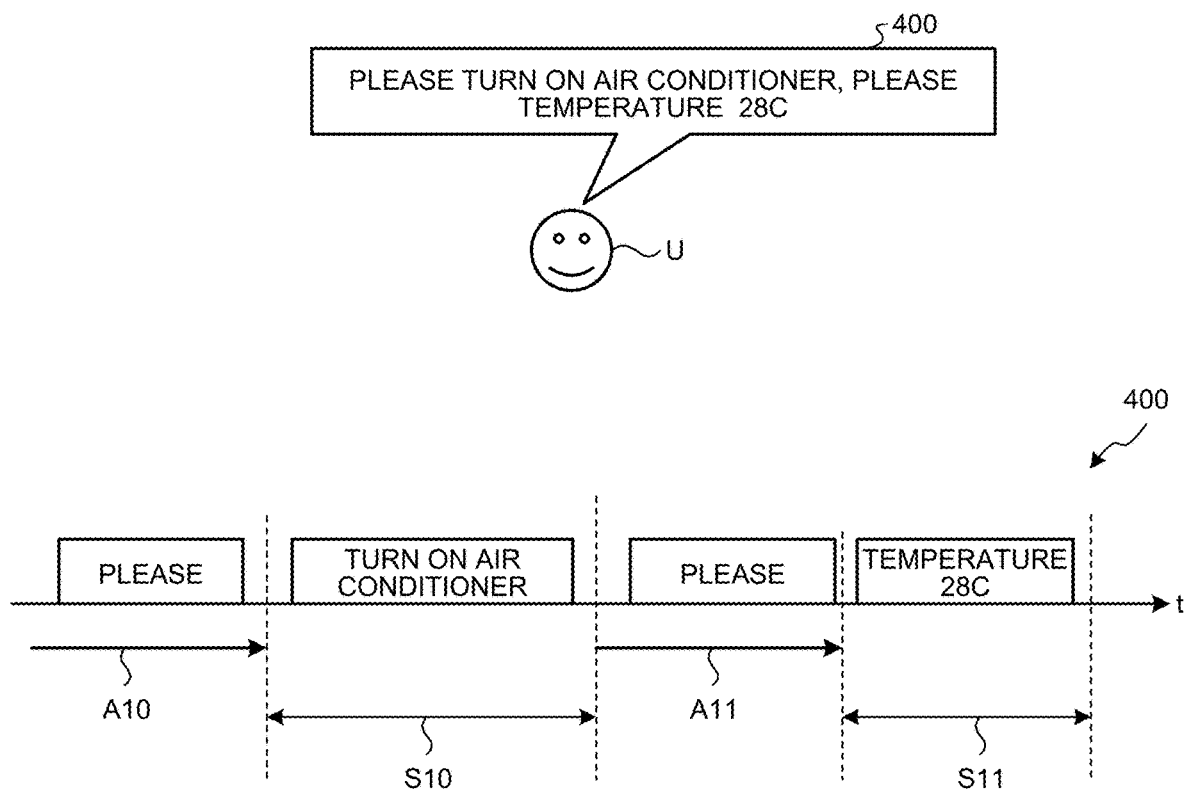
FIG. 7A is an explanatory drawing of conventional speech recognition.
Figure 7B:
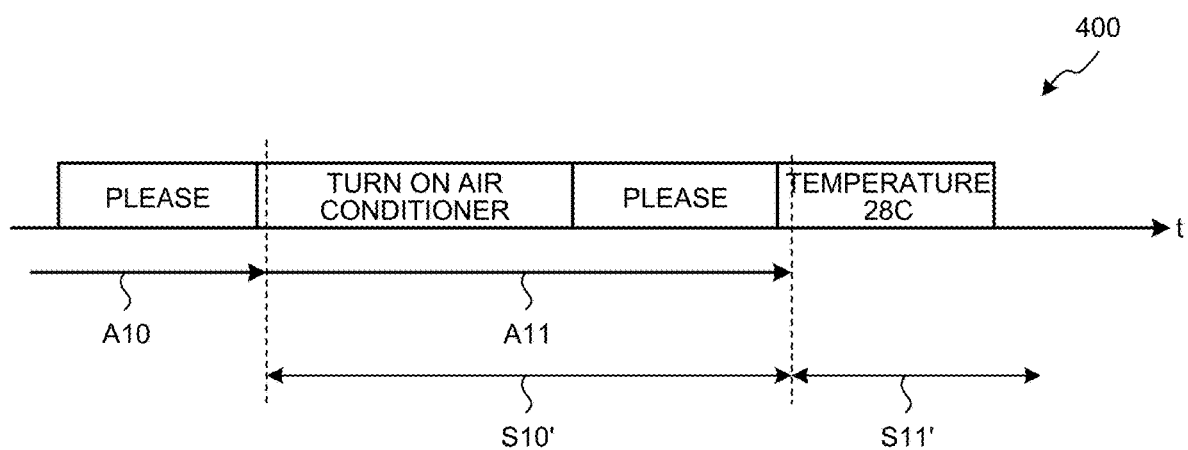
FIG. 7B is an explanatory drawing of conventional speech recognition.

FIG. 7A and FIG. 7B are explanatory drawings illustrating conventional voice speech recognition. Suppose that the user U speak, "please turn on the air conditioner, please temperature 28° C." and a voice signal 400 of the speech be subjected to voice speech recognition, for example. Also, suppose that the word "please" in the voice signal 400 be a trigger.

As illustrated in FIG. 7A, for example, the triggers and the words other than the triggers are intermittently spoken. In this case, conventionally, the voice signal 400 is read from the head in chronological order. After the trigger "please" in the voice signal 400 is detected (see arrow A10), the words "turn on the air conditioner" following the trigger are recognized (see arrow S10). Then, after another trigger "please" is detected (see arrow A11), the words "temperature 28° C." following the trigger are recognized (see Arrow S11). Thus, as for the triggers and the words other than the triggers intermittently spoken, the words spoken after the triggers are conventionally recognized.

However, it is difficult to perform voice speech recognition of the voice signal 400 of continuous utterance of words including multiple triggers, as illustrated in FIG. 7B. Specifically, upon detection of the first trigger "please" from the voice signal 400, the words "turn on the air conditioner, please temperature 28° C." are recognized from the next voice signal. Thus, although information on the detection of the trigger "please" can be displayed on the screen, the detection of the second trigger "please" cannot be displayed. In addition, referring to FIG. 3, the first trigger is "model number", the second trigger is "voltage", the "model number" is alphabets, and the "voltage" is expressed in numbers and unit. To be able to improve voice speech recognition accuracy, the model number "AAB" needs to be recognized referring to a voice speech recognition dictionary for alphabets only, and the voltage "20 V" needs to be recognized referring to a voice speech recognition dictionary for numbers and unit only. However, the model-number part and the voltage part are recognized, referring to the same voice speech recognition dictionary, therefore, voice speech recognition accuracy cannot be improved.

For another example, upon detection of the trigger "please" from the voice signal 400 (see arrow A10), voice speech recognition of a section S10' subsequent to the trigger "please" starts. Upon detection of the subsequent trigger "please" (see arrow A11) during the voice speech recognition of the section S10', the voice speech recognition of the section S10' is nullified, so that a section S11' subsequent to the second detected trigger "please" is not recognized.

In addition, conventional voice speech recognition may not deal with continuous speech without pause between the trigger and the speech after the trigger and between the speech and the next trigger, and it may fail to detect the triggers and perform voice speech recognition of the speech after the trigger.

Thus, as for continuous speech of words including multiple triggers, conventional voice speech recognition may fail to recognize at least part of the words following the triggers from the voice signal 400, resulting in decrease in voice speech recognition accuracy with respect to the speech following the triggers.

Further, conventional voice speech recognition uses only a dictionary containing no trigger sound sections (corresponding to the voice speech recognition dictionary 26C of the present embodiment) for the voice signal 400. Because of this, conventional voice speech recognition may fail to recognize words following the triggers due to failure in identification of the end of the trigger or the head of the word caused by missing in the head of the word or entry of noise.

By contrast, in the information processing apparatus 10 according to the present embodiment, the voice speech recognizer 12C performs voice speech recognition of the trigger sound section T of the detected trigger and the recognition sound section S subsequent to the trigger sound section T in the voice signal 40, in accordance with the trigger and voice speech recognition dictionary 26B corresponding to the detected trigger, to thereby acquire a result of voice speech recognition of the recognition sound section S. In addition, the trigger and voice speech recognition dictionary 26B is for deriving the result of voice speech recognition of the recognition sound section S not only from the trigger sound section T but both the trigger sound section T and the recognition sound section S.

Thus, the information processing apparatus 10 according to the present embodiment can perform voice speech recognition, without omission, of the recognition sound sections S subsequent to the trigger sound sections T of all the triggers included in the voice signal 40. That is, for continuous utterance of multiple words including multiple triggers, the information processing apparatus 10 according to the present embodiment can perform voice speech recognition of the recognition sound sections S continuously following all the triggers contained in the voice signals 40 of the utterance, referring to the dictionary corresponding to the detected triggers.

As a result, the information processing apparatus 10 according to the present embodiment can provide improved voice speech recognition.

Figure 8A:
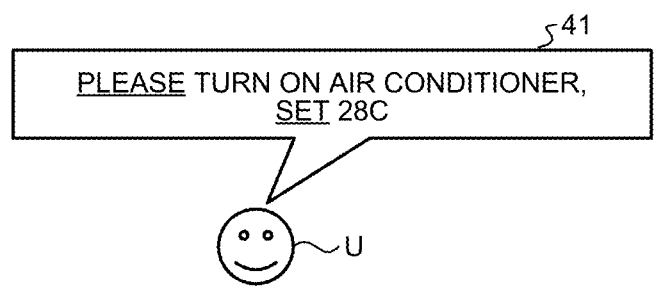
FIG. 8A is an explanatory drawing of speech recognition.
Figure 8B:
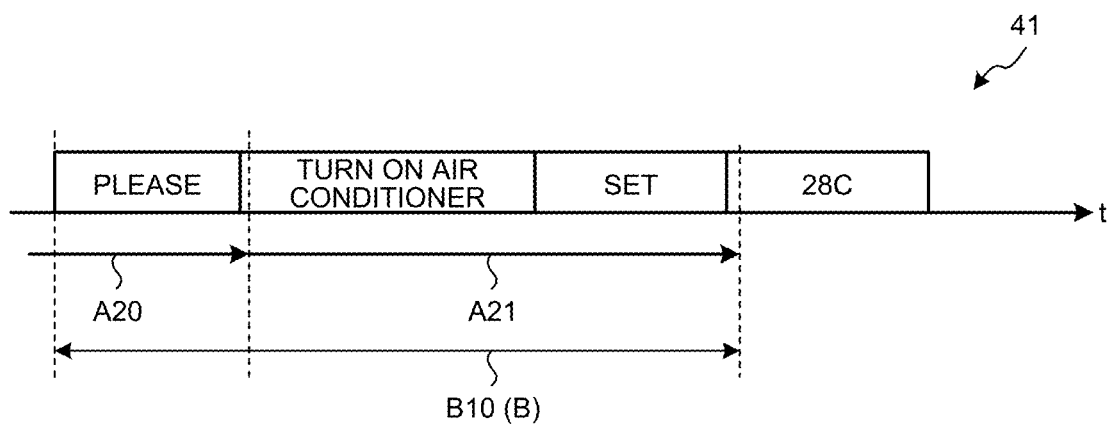
FIG. 8B is an explanatory drawing of speech recognition.

FIG. 8A and FIG. 8B are explanatory drawings of voice speech recognition of a first modification. For example, suppose that the user U speak "please turn on the air conditioner and set at 28° C." and a voice signal 41 of the speech be subjected to voice speech recognition. Also, suppose that the words "please" and "set" in the voice signal 41 serve as triggers.

In this case, the detector 12B reads the voice signal 41 from the head in chronological order, and executes trigger detection (see arrow A20). The detector 12B reads the trigger sound section of the trigger "please" in the voice signal 41 and detects the trigger "please". The voice speech recognizer 12C performs voice speech recognition of a unitary section B10 including the trigger sound section, referring to the trigger and voice speech recognition dictionary 26B corresponding to the trigger ID of the detected trigger "please", in the same manner as in the above embodiment.

The detector 12B continues trigger detection (see arrow A21), and reads and detects the trigger "set". The voice speech recognizer 12C performs voice speech recognition of the unitary section including the trigger sound section, referring to the trigger and voice speech recognition dictionary 26B corresponding to the trigger ID of the detected trigger "set" in the same manner as in the above embodiment.

Thereby, in the first modification, the information processing apparatus 10 can switch the trigger and voice speech recognition dictionaries 26B for the voice speech recognition of terms representing devices such as "air conditioner" after the trigger "please" and for the voice speech recognition of the number "28" after the trigger "set", thereby achieving accurate voice speech recognition.

The triggers (trigger words) may be set in advance or added by the user. For example, the output controller 12D displays a list of less frequently used voices and/or words on the display 18. With the display, the output controller 12D presents the list of the voices and/or words to the user. The controller 12 may set voices and/or words selected in accordance with a user's operation to the input 22 as the triggers.

Second Modification

When a speaker emitting voice can be estimated, the information processing apparatus 10 may prepare combinations of triggers and speakers in advance. Speaker estimation refers to identifying the individual who has emitted the voice from the voice signal acquired by the voice acquirer 12A. Due to the prepared combinations of triggers and speakers, the controller 12 can change the voice speech recognition dictionaries (trigger and voice speech recognition dictionary 26B and voice speech recognition dictionary 26C) for the same trigger word, if a different speaker speaks the trigger word.

Further, the information processing apparatus 10 may additionally include the combinations of triggers and speakers to thereby validate or invalidate the result of voice speech recognition in accordance with speaker information. For example, the controller 12 may output a result of recognition as a control signal without change when the speaker is the administrator and speaks the control of a device, but may terminate voice speech recognition for a certain period of time when detecting the trigger spoken by the speaker being a general user.

Hardware Configuration

Figure 9:
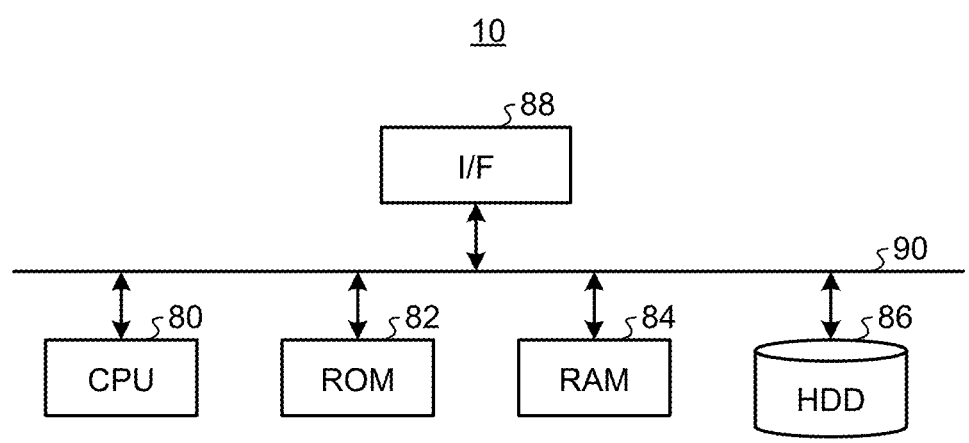
FIG. 9 is a block diagram illustrating an exemplary hardware configuration of the information processing apparatus.

Next, the hardware configuration of the information processing apparatus 10 according to the embodiment will be described. FIG. 9 is a block diagram illustrating an exemplary hardware configuration of the information processing apparatus 10 according to the embodiment.

The information processing apparatus 10 according to the embodiment has a hardware configuration of a general computer, including a CPU 80, a read only memory (ROM) 82, a random access memory (RAM) 84, a HDD 86, and an interface (I/F) 88 mutually connected through a bus 90.

The CPU 80 is an arithmetic unit that controls information processing of the information processing apparatus 10 according to the embodiment. The RAM 84 stores therein data required for various types of processing performed by the CPU 80. The ROM 82 stores therein a program for implementing various types of processing by the CPU 80. The HDD 86 stores therein data to be stored in the voice audio data storage 24 and the storage 26. The interface 88 is an interface for transmitting and receiving data to and from other devices.

The program to execute the various types of processing by the information processing apparatus 10 according to the embodiment is incorporated and provided in advance in the ROM 82, for example.

Programs to be executed by the information processing apparatus 10 according to the embodiment may be recorded and provided in installable or executable file format on a computer-readable recording medium such as a CD-ROM, a flexible disk (FD), a CD-R, a digital versatile disc (DVD).

Programs to be executed by the information processing apparatus 10 according to the embodiment may be stored on a computer connected to a network such as the Internet, and downloaded and provided through the network. The program to execute the various types of processing by the information processing apparatus 10 according to the embodiment may be provided or distributed through a network, such as the Internet.

The program to execute the various types of processing in the information processing apparatus 10 according to the embodiment is configured to generate the above elements on the main storage device.

The various types of information may be stored in an external device in place of the HDD 86. In this case, the external device and the CPU 80 are connected through a network.

While certain embodiments have been described, these embodiments have been presented by way of example only, and are not intended to limit the scope of the inventions. Indeed, the novel embodiment and modifications described herein may be embodied in a variety of other forms; furthermore, various omissions, substitutions and changes in the form of the embodiment and modifications described herein may be made without departing from the spirit of the inventions. The accompanying claims and their equivalents are intended to cover such forms or modifications as would fall within the scope and spirit of the inventions.

What is claimed is:

1. An information processing apparatus comprising one or more processors configured to:
   detect a trigger from a voice signal including a unitary section ranging from a head of a trigger sound section to a predetermined end after the trigger sound section, the trigger indicating start of speech recognition; and
   perform speech recognition of a recognition sound section subsequent to the trigger sound section comprising the detected trigger, by referring to a trigger and speech recognition dictionary corresponding to the trigger, wherein the unitary section includes at least the trigger sound section and the recognition sound section.

2. The apparatus according to claim 1, wherein the one or more processors:

perform speech recognition of the recognition sound section in the unitary section of the voice signal, by referring to the trigger and speech recognition dictionary corresponding to the detected trigger, the unitary section ranging from the head of the trigger sound section of the detected trigger to a silence section following the trigger sound section, and perform speech recognition of a sound section subsequent to the silence section of the voice signal, referring to a speech recognition dictionary corresponding to the detected trigger and for deriving a result of speech recognition of the sound section.

3. The apparatus according to claim 1, wherein the unitary section:

has a particular length starting from the head of the trigger sound section of the detected trigger and exceeding a length of the trigger sound section, a range from the head of the trigger sound section of the detected trigger to a head of another trigger sound section following the trigger sound section, or a range from the head of the trigger sound section of the detected trigger to a silence section following the trigger sound section.

4. The apparatus according to claim 1, wherein the one or more processors output a result of the speech recognition.

5. The apparatus according to claim 4, wherein the one or more processors remove, from each of results of the speech recognition, a result of speech recognition of another section after the section corresponding to each of the results in the voice signal, for output.

6. The apparatus according to claim 5, wherein the one or more processors:

receive a selection of the result of speech recognition to output, and output the received result of speech recognition among the results of voice speech recognitions.

7. A computer program product comprising a non-transitory computer readable medium comprising programmed instructions, the instructions causing the computer to execute:

detecting a trigger from a voice signal including a unitary section ranging from a head of a trigger sound section to a predetermined end after the trigger sound section, the trigger indicating start of speech recognition; and performing speech recognition of a recognition sound section subsequent to the trigger sound section comprising the detected trigger, by referring to a trigger and speech recognition dictionary corresponding to the trigger, wherein the unitary section includes at least the trigger sound section and the recognition sound section.

8. An information processing method comprising:

detecting a trigger from a voice signal including a unitary section ranging from a head of a trigger sound section to a predetermined end after the trigger sound section, the trigger indicating start of speech recognition; and performing speech recognition of a recognition sound section subsequent to the trigger sound section comprising the detected trigger, by referring to a trigger and speech recognition dictionary corresponding to the trigger, wherein the unitary section includes at least the trigger sound section and the recognition sound section.

* * * * *